US010288197B2

(12) United States Patent
Grossman (10) Patent No.: US 10,288,197 B2
(45) Date of Patent: May 14, 2019

(54) CONDUIT WITH LATCH SYSTEM

(71) Applicant: Benjamin Grossman, Sao Paulo (BR)

(72) Inventor: Benjamin Grossman, Sao Paulo (BR)

(*) Notice: Subject to any disclaimer, the term of this patent is extended or adjusted under 35 U.S.C. 154(b) by 0 days.

(21) Appl. No.: 15/471,830

(22) Filed: Mar. 28, 2017

(65) Prior Publication Data

US 2018/0010716 A1 Jan. 11, 2018

Related U.S. Application Data

(60) Provisional application No. 62/360,637, filed on Jul. 11, 2016.

(51) Int. Cl.
| | | |
|---|---|---|
| *F16L 11/12* | (2006.01) | |
| *H02G 3/04* | (2006.01) | |
| *H02G 9/06* | (2006.01) | |
| *F16L 57/00* | (2006.01) | |

(52) U.S. Cl.
CPC ............... *F16L 11/12* (2013.01); *F16L 57/00* (2013.01); *H02G 3/0481* (2013.01); *H02G 9/065* (2013.01)

(58) Field of Classification Search
CPC .................................... F16L 3/26; Y10S 24/50
USPC .......................... 138/156, 166–169, 128, 163
See application file for complete search history.

(56) References Cited

U.S. PATENT DOCUMENTS

| | | | | |
|---|---|---|---|---|
| 1,485,994 | A * | 3/1924 | Salisbury ................ | H02G 7/00 138/128 |
| 1,933,279 | A * | 10/1933 | Quarnstrom .......... | B21C 37/101 126/307 R |
| 2,884,958 | A * | 5/1959 | Asselin, Sr. .......... | B21C 37/101 138/171 |
| 3,517,702 | A * | 6/1970 | Trimble ................ | F16L 59/022 138/128 |
| 4,830,061 | A * | 5/1989 | Karakawa ............... | F16L 59/10 138/110 |
| 4,865,890 | A * | 9/1989 | Erlichman .............. | B29C 61/10 428/35.1 |
| 4,944,976 | A * | 7/1990 | Plummer, III ....... | H02G 3/0481 138/110 |
| 5,875,821 | A * | 3/1999 | Dumser .................. | F24F 13/20 138/157 |
| 6,079,451 | A * | 6/2000 | Hegler ................. | H02G 3/0468 138/110 |
| 6,227,251 | B1 * | 5/2001 | Ahn ......................... | H02G 7/00 138/110 |
| 7,891,383 | B2 * | 2/2011 | Baverel .................. | B26D 3/001 138/115 |
| 8,859,898 | B2 * | 10/2014 | Frye ..................... | H02G 3/0481 138/128 |

* cited by examiner

*Primary Examiner* — Patrick F Brinson
(74) *Attorney, Agent, or Firm* — The Fraser Firm P.C.; Keith Fraser (57) ABSTRACT

A conduit system for protection of wiring or tubing comprising a tubular shaped conduit with latch system designed to allow insertion of electrical wiring without disconnection of the wiring or without threading the wiring through the conduit. The latch system is comprised of an internal latch, external latch or both and is formed to such that the conduit maintains its structural integrity while facilitating full and easy access to the electrical wiring contained within.

6 Claims, 8 Drawing Sheets

CONDUIT WITH LATCH SYSTEM

RELATED APPLICATIONS

This application claims the benefit of priority under 35 U.S.C. 119(e) of the Provisional Application Filing No. 62/360,637 filed on Jul. 11, 2016. This provisional application is incorporated by reference herein in its entirety.

BACKGROUND OF THE INVENTION

1. Field of the Invention

The present invention generally relates to conduits for concealing and protecting pipework, cables, electrical wiring, optical cables and the like. More specifically, the invention relates to a conduit system comprising a longitudinal latch mechanism allowing for access to the wiring, cables and/or pipework contained within and designed to maintain structural integrity of the conduit.

2. Description of the Prior Art

Conduits are commonly used for concealing, routing, and protecting wiring, piping and cables in a variety of domestic and industrial applications. It is often necessary to access the wiring, piping or cables that run through the conduits for repair, service or replacement. Accordingly, several conduit systems have been developed that consist of a hinged or latched cover designed to allow such access. Typically, the cover runs longitudinally along the length of the conduit allowing access, once the cover is opened, to the entire length of wiring or piping. Such full access is desired as it allows for easy replacement of the wire or piping without having to thread or route the new wire or piping through the conduit. Current latch and cover designs that seek to address these issues compromise conduit integrity and render the conduit prone to breakage from even a minor compression or other force. The present latch systems have also proven complicated and fragile, often breaking at points along the conduit either from the aforementioned compression of the conduit as a whole or from repeated use of the complicated latch mechanism. This also results in a breach of conduit's integrity allowing dirt, debris, pests, and other contaminants into the conduit which can result in damage to the wire, piping or cables.

What is needed therefore is an improved latched conduit system that provides for access along the entire length of the conduit but with a latch formed such that the strength of the conduit remains intact wherein the conduit can withstand compressive, shear and tensile forces that such conduits are typically subjected to in ordinary use and where the latch system is simple to manufacture and use and remains viable and intact notwithstanding being subjected to the same typical forces and to repeated use.

3. SUMMARY OF THE INVENTION

The present invention achieves the objects set forth above by providing a conduit system comprising a tubular conduit that further comprises a cut along the length of the tubular conduit. The longitudinal cut along the tubular conduit results in two conduit edges. The tubular conduit is formed to maintain a substantially circular cross section with the circular cross section of a dimension sufficient to allow the two conduit edges along the longitudinal cut to extend past each other and thus overlap each other in forming the circular cross section of the tubular conduit. The conduit is further formed such that its resulting rigidity allows for the two overlapping conduit walls and conduit edges to maintain a point of contact and pressure engagement that continues along an arc defined by the circular cross section of the conduit. The length of this arc is sufficient such that with the two overlapping conduit edges so positioned and formed, the result is a conduit that is effectively closed. The length of this arc comprising the overlapping conduit walls and conduit edges is also such that the conduit is strengthened and thus protected from collapse or inadvertent opening due to outside forces. The conduit further comprises a latch system comprising a hooked protrusion and incorporating one or both of the conduit edges. The hooked protrusion is located either on the exterior of the conduit or the interior of the conduit or both. In each instance and in each location, the hooked protrusion is further positioned and formed to make contact with and receive one of the conduit edges and is further positioned and formed such that with slight pressure from the user on the conduit body, the conduit edge in contact with and received by the hooked protrusion latches securely within the hooked protrusion in a manner that provides a secure locking latch. To access the interior of the conduit, the user would apply pressure on the conduit sufficient to provide a quick release of the conduit edge from the hooked protrusion and open the conduit along the longitudinal cut.

This arrangement provides a combination, heretofore not found in the art, of ease of closing and latching, ease of opening, the maintaining of a substantially circular shape and increased strength resulting from the overlapping conduit walls which thereby provides the conduit with structural strength and resistance to compressive and other loads. This arrangement also provides a latch system that is robust, easy to use and easy and inexpensive to manufacture. Further, the latch system design allows for the structural integrity of the conduit to be maintained. These benefits and others will be further described in the detailed description of preferred embodiments and with reference to the accompanying drawings.

5. DETAILED DESCRIPTION OF THE INVENTION

Figure 1:
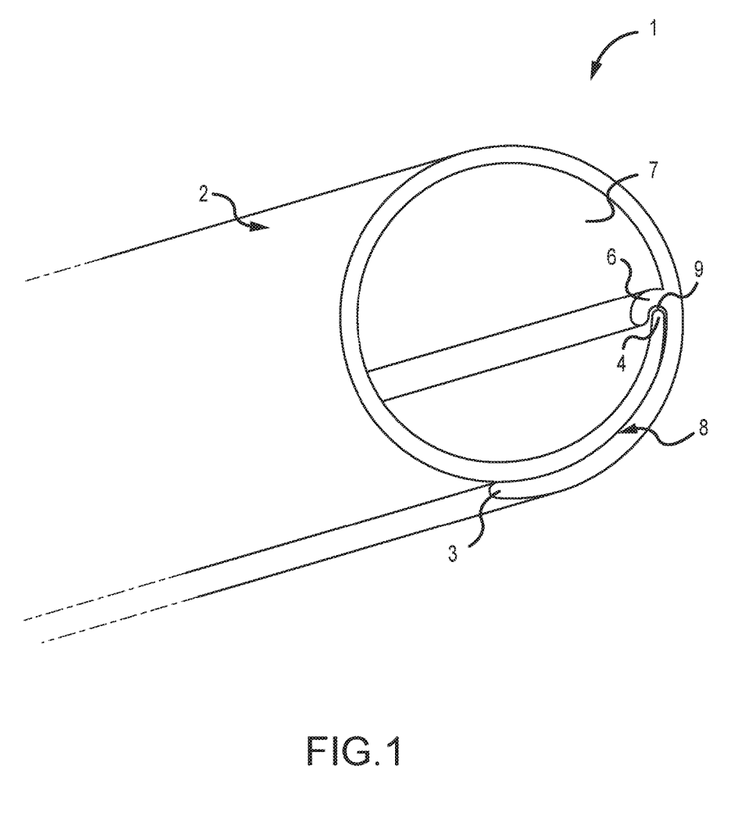
FIG. 1 is a perspective view of a section of a conduit and latch system according to the invention.
Figure 2:
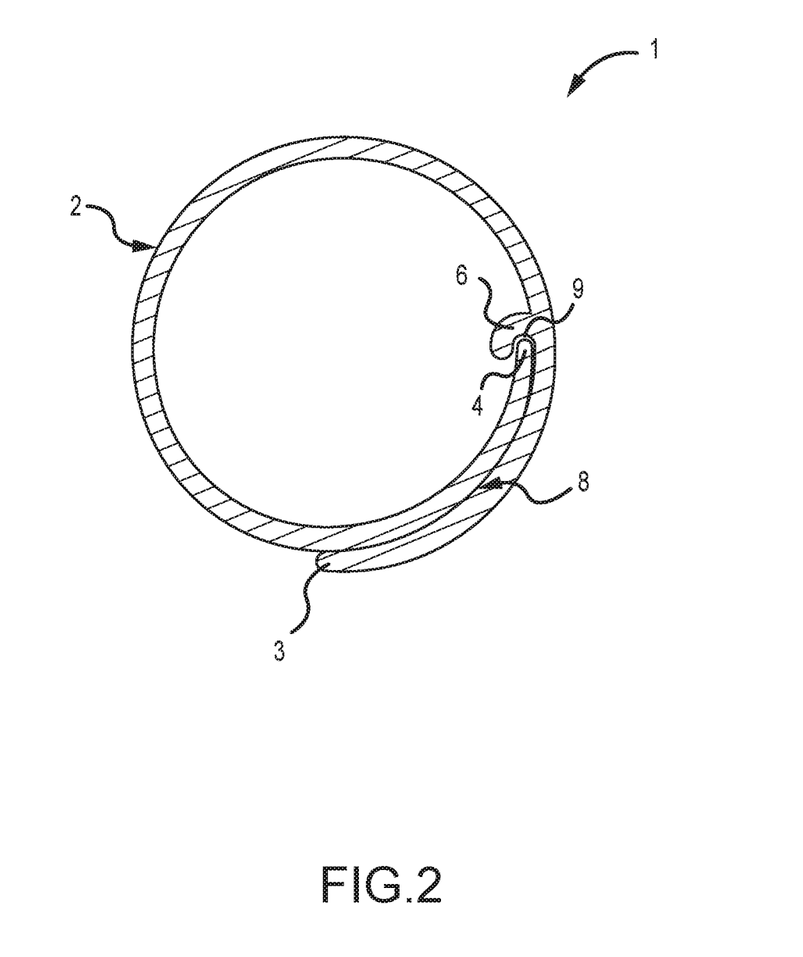
FIG. 2 is a cross-sectional side view of a conduit and latch system according to the invention wherein the latch is in the closed position.

The conduit and latch system (1) shown in FIGS. 1 and 2 comprises a conduit (2) of a substantially circular cross-section. The conduit (2) further comprises a first conduit edge (3) and a second conduit edge (4). The first and second conduit edges (3, 4) are formed from a longitudinal cut through and along the length of the conduit (2). The conduit (2) further comprises an interior hooked protrusion (6) formed from and extending from the conduit (2). In the embodiment shown in FIGS. 1 and 2, the protrusion extends from the interior wall (7) of the conduit (2). The conduit (2) is generally made of PVC. The conduit is further formed to allow both the conduit walls and the first and second conduit edges (3, 4) to overlap and maintain contact pressure along an arc (8) defined by the circular cross section of the conduit (2). The length of the arc (8) is sufficient to provide for the effective enclosing of the tubular conduit (2) and of sufficient length such that slight compression of the conduit (2) in an amount typically applied during handling and normal use of the conduit (2) will not result in the first and second conduit edges (3, 4) completely separating and allowing inadvertent opening of the conduit (2). As shown in FIG. 2, the interior hooked protrusion (6) extends away from the interior wall (7) and down toward the second conduit edge (4). The resulting shape and position of the interior hooked protrusion (6) allows for the second conduit edge (4) to engage the interior hooked protrusion (6) and to be received within the latch space (9) defined by the interior hooked protrusion (6). Engagement of the second conduit edge (4) in the latch space (9) is accomplished by applying sufficient pressure on the conduit (2) to slightly deform the substantially circular shape of the conduit (2) until the second conduit ledge (4) snaps past the interior hooked protrusion (6) and into the latch space (9).

Figure 3:
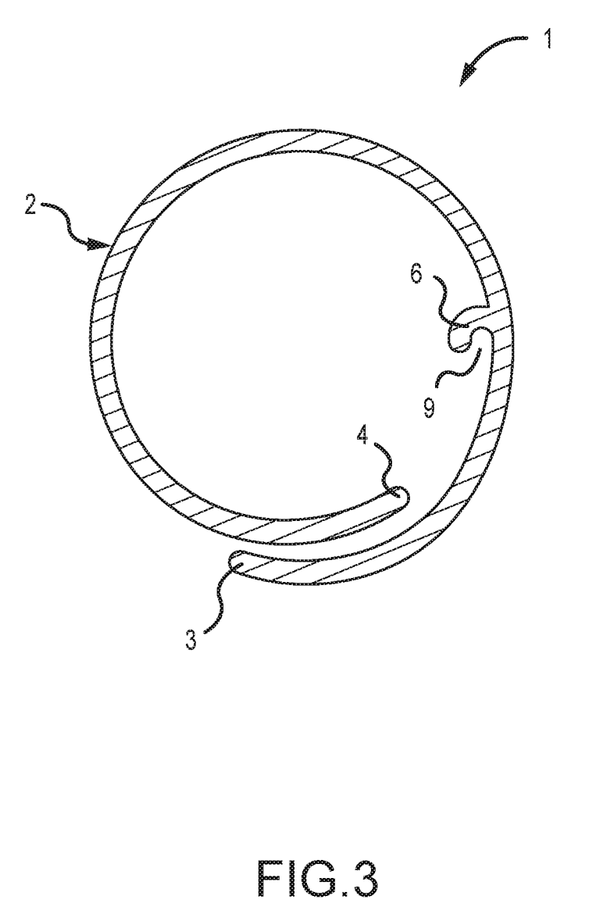
FIG. 3 is a cross-sectional side view of a conduit and latch system according to the invention wherein the latch is held in the open position.

FIG. 3 shows the conduit and latch system (1) of a particular embodiment in an open position. In this position, the first and second conduit edges (3, 4) are separated by the application of pressure to overcome the contact force between the overlapped portions of the conduit (1). The conduit's construction allows for the application of such a force, being generally constructed of flexible and pliable PVC. This same construction also permits the proper operation of the latch system described above, namely the insertion of the second conduit edge (4) within the latch space (9) formed by the interior hooked protrusion (6).

Figure 5:
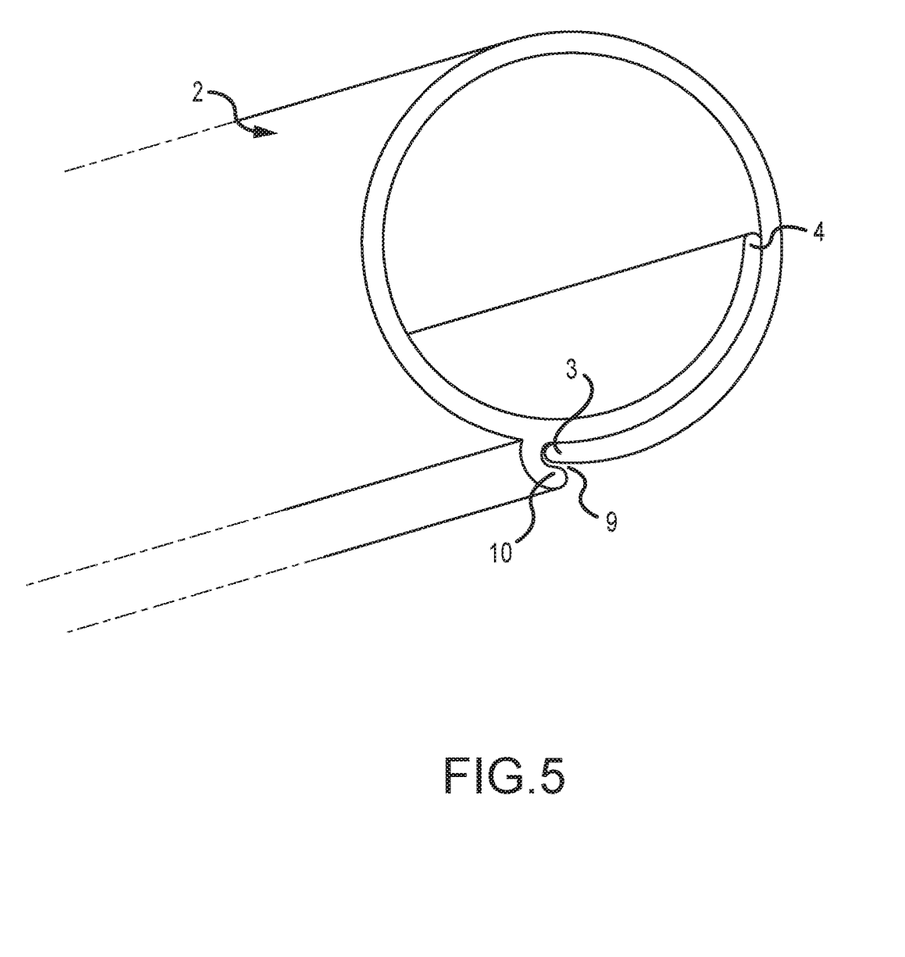
FIG. 5 is a cross-sectional side view of a conduit and latch system according to the invention wherein the latch is closed and positioned on the outside wall of the conduit.
Figure 6:
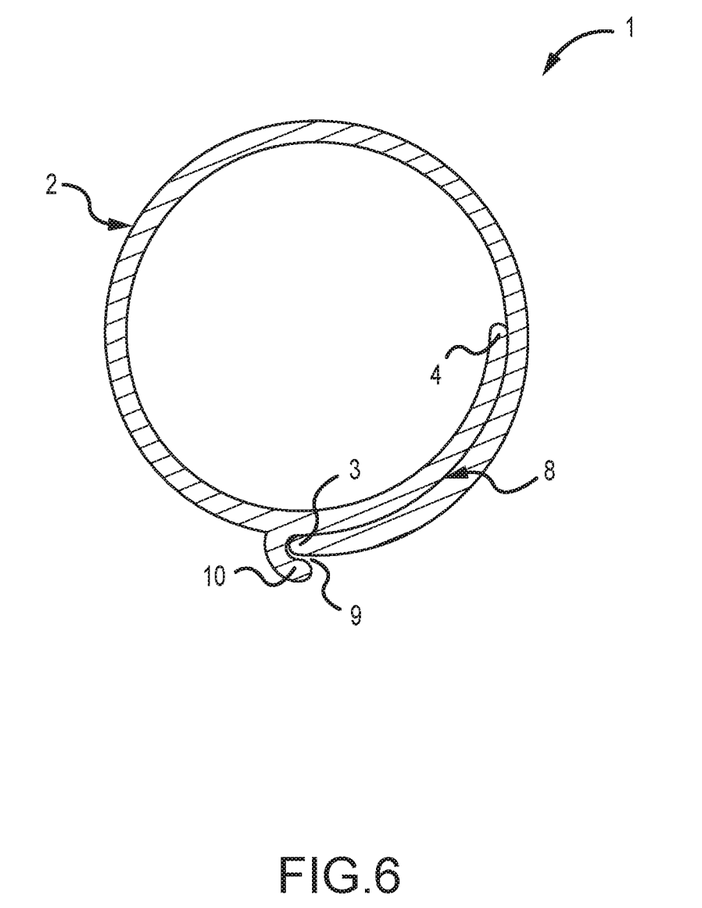
FIG. 6 is a perspective view of a section of a conduit and latch system according to the invention wherein the latch is positioned on the outside wall of the conduit.

FIGS. 5 and 6 show another embodiment of the invention. In FIG. 5, the conduit (2) comprises an exterior hooked protrusion (10) extending from the exterior wall (11) of the conduit (2). In this embodiment, the exterior hooked protrusion (10) is shaped to form the latch space (9) with said latch space (9) designed and formed to receive the first conduit edge (3). The resulting shape and position of the exterior hooked protrusion (10) allows for the first conduit edge (3) to engage the exterior hooked protrusion (10) and to be received within the latch space (9) defined by the exterior hooked protrusion (10). The operation of the conduit latch system (1) shown in FIG. 5 is accomplished in the same manner. Specifically, pressure is applied to the conduit (2) sufficient to deform the substantially circular cross section of the conduit (2) to allow the first conduit edge (3) to engage the exterior hooked protrusion (10) and to be received within the latch space (9).

Figure 4:
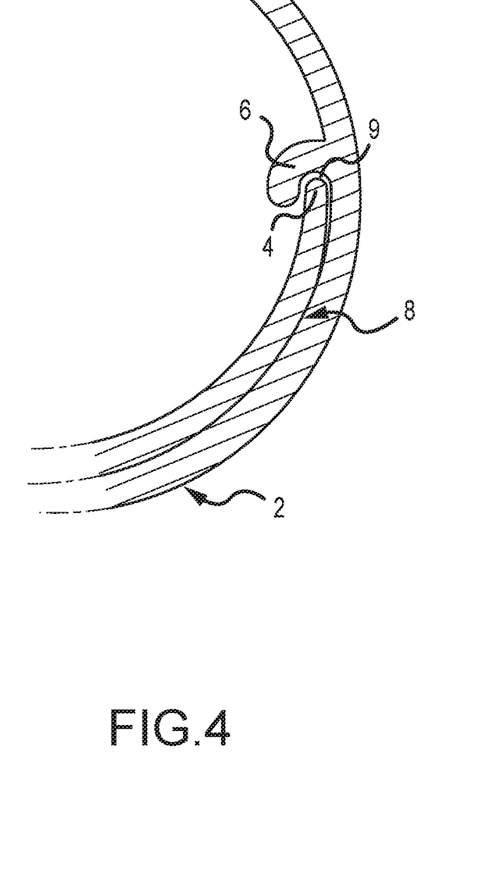
FIG. 4 is a partial enlarged view of a latch system according to the invention.

FIG. 4 shows the second conduit edge (4) securely latched within the latch space (9). As shown in this embodiment, the latch space is defined by the interior hooked protrusion (6), which is formed from and extends from the conduit (2).

Figure 7:
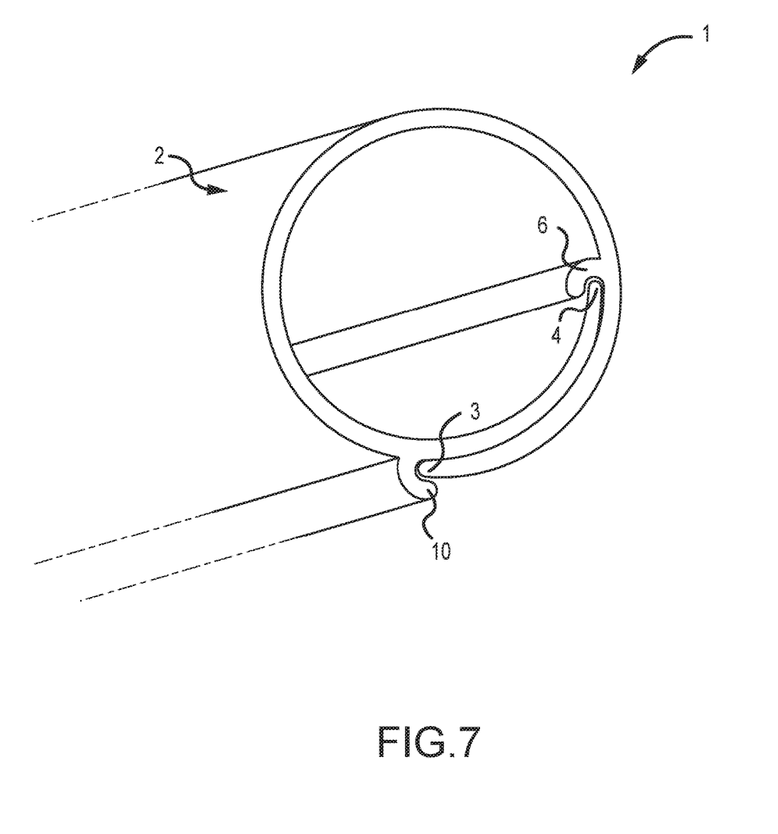
FIG. 7 is a perspective view of a section of a conduit and latch system according to the invention wherein the latch system comprises two latches with one latch positioned on the inside wall of the conduit and the second latch positioned on the outside wall of the conduit.
Figure 8:
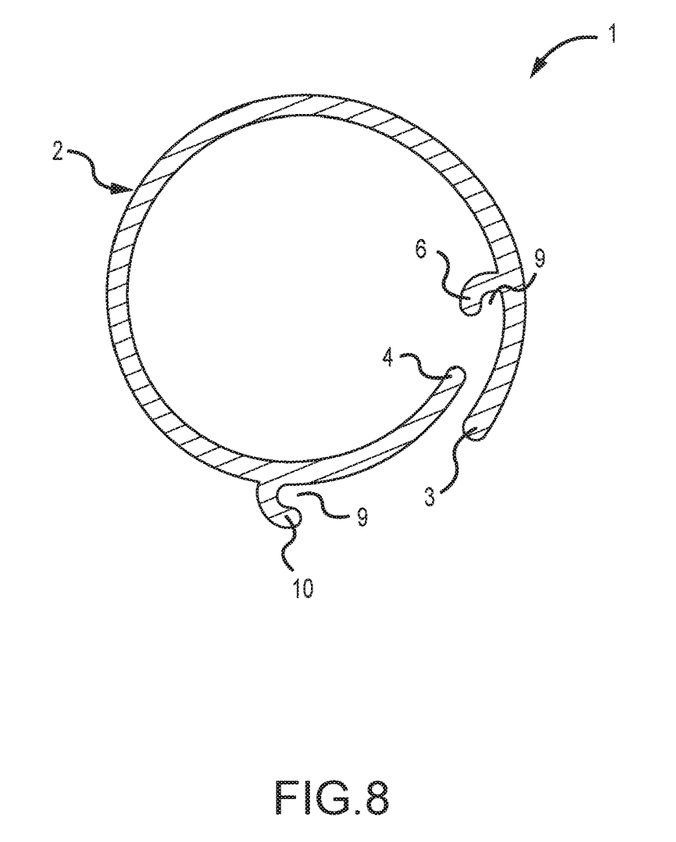
FIG. 8 is a cross-sectional side view of a conduit and latch system according to the invention wherein the latch is open and comprised of two latches.

FIG. 7 shows an embodiment of the invention that provides for a conduit and latch system (1) comprising both an interior hooked protrusion (6) and an exterior hooked protrusion (10). As configured, the first conduit edge (3) is received within the latch space (9) defined by exterior hooked protrusion (10) and the second conduit edge (4) is received within the latch space (9) defined by the interior hooked protrusion (6). Operation of the conduit and latch system (1) in this embodiment is accomplished in a similar manner as with the other embodiments described herein. Specifically, FIG. 8 shows the conduit and latch system (1) of this embodiment in the open position. To close the conduit and latch system (1), pressure is applied to the conduit (2) sufficient to allow the overlapping of the conduit walls and the and to allow the overlapping first and second conduit edges (3, 4) to snap in their respective latch spaces (9) defined by the interior and exterior hooked protrusions (6, 10).

While the invention has been shown and described in connection with specific examples and embodiments, the invention is not limited to those. Those skilled in the art will recognize that changes and modifications may be made without departing from the description of the invention and that the matter set forth in the foregoing description and accompanying drawings is offered by way of illustration and not as a limitation.

The invention claimed is:

1. A conduit and latch system comprising a conduit of a substantially circular cross section, said conduit being axially elongated and characterized by an axial slit along the length of said conduit whereby two conduit wall edges are formed and whereby said conduit may be resiliently opened along the length thereof to permit the introduction of cables, pipes, wires and the like, and said conduit being formed to create an overlap of a portion of the exterior wall of said conduit with a portion of the interior wall of said conduit along said conduit wall edges such that the conduit is strengthened and protected from outside forces and said conduit comprising an integrated hooked protrusion along the longitudinal length of said conduit with said hooked protrusion positioned to accept engagement of at least one of said conduit edges along said axial slit and with said hooked protrusion configured to provide a secure locking latch upon the acceptance of engagement of the at least one of said conduit edges and said hooked protrusion further configured to allow for the quick release of said engagement upon the application of pressure along one of the said conduit wall edges.

2. A conduit and latch system as set forth in claim 1 wherein said hooked protrusion is integral with the interior wall of said conduit.

3. A conduit and latch system as set forth in claim 1 wherein said hooked protrusion is integral with the exterior wall of said conduit.

4. A conduit and latch system comprising a conduit of a substantially circular cross section, said conduit being axially elongated and characterized by an axial slit along the length of said conduit whereby two conduit wall edges are formed and whereby said conduit may be resiliently opened along the length thereof to permit the introduction of cables, pipes, wires and the like, and said conduit being formed create an overlap of a portion of the exterior wall of said conduit with a portion of the interior wall of said conduit along said conduit wall edges such that the conduit is strengthened and protected from outside forces and said conduit comprising two integrated hooked protrusions along the longitudinal length of said conduit with each said hooked protrusion positioned to accept engagement of one of said conduit edges along said axial slit and with each said hooked protrusion configured to provide a secure locking latch upon the acceptance of engagement of the said conduit edges and each said hooked protrusion further configured to allow for the quick release of said engagement upon the application of pressure along one of the said conduit wall edges.

5. A conduit and latch system of claim 4 wherein one of said hooked protrusions is integral with the exterior wall of said conduit and the other of said hooked protrusions is integral with the interior wall of said conduit.

6. A conduit and latch system of claim 1 wherein the said conduit is constructed from a resilient, self-supporting plastic material.

* * * * *